(12) United States Patent
Mannebeck et al.

(10) Patent No.: US 10,314,290 B2
(45) Date of Patent: Jun. 11, 2019

(54) FEEDING STATION FOR FARM ANIMALS, IN PARTICULAR FOR PIGS

(71) Applicant: Fancom B.V., Panningen (NL)

(72) Inventors: Dieter Mannebeck, Panningen (NL); Erik Joannes Matheus Vranken, Panningen (NL); Wouter Bernardus Lambertus Hoolboom, Panningen (NL)

(73) Assignee: FANCOM B.V., Panningen (NL)

( * ) Notice: Subject to any disclaimer, the term of this patent is extended or adjusted under 35 U.S.C. 154(b) by 219 days.

(21) Appl. No.: 15/491,079

(22) Filed: Apr. 19, 2017

(65) Prior Publication Data

US 2017/0303503 A1 Oct. 26, 2017

(30) Foreign Application Priority Data

Apr. 20, 2016 (NL) ..................................... 2016638

(51) Int. Cl.
*A01K 5/00* (2006.01)
*A01K 5/02* (2006.01)

(52) U.S. Cl.
CPC ............ *A01K 5/0283* (2013.01); *A01K 5/005* (2013.01); *A01K 5/0208* (2013.01);
(Continued)

(58) Field of Classification Search
CPC .... A01K 5/005; A01K 5/0208; A01K 5/0225; A01K 5/0216; A01K 5/0258; A01K 5/0275; A01K 5/0283
See application file for complete search history.

(56) References Cited

U.S. PATENT DOCUMENTS

| 3,169,799 A * | 2/1965 | Puckett | ..................... A01K 5/02 406/108 |
| 3,339,530 A * | 9/1967 | Gillette | ..................... A01K 5/00 119/51.11 |

(Continued)

FOREIGN PATENT DOCUMENTS

| EP | 0 677 245 | 10/1995 |
| EP | 0 741 965 | 11/1996 |
| WO | WO 2009/090250 | 7/2009 |

OTHER PUBLICATIONS

Dutch Search Report dated Nov. 2, 2016 for Appln. No. 2016638.

*Primary Examiner* — Trinh T Nguyen
(74) *Attorney, Agent, or Firm* — Pillsbury Winthrop Shaw Pittman, LLP

(57) ABSTRACT

A feeding station for farm animals (45), as in particular for pigs, provided with a first reservoir (3) for a first animal food component, a first conveyor pipe (15) connected to the first reservoir (3), with a first conveyor screw (17) extending internally of the first conveyor pipe (15), and a mouthpiece (7) for reception in the mouth of an animal (45). A first end of the first conveyor screw (17) is coupled adjacent to the first reservoir (3) to a rotatable first drive (21) and a second end of the first conveyor screw (17) ends shortly before the mouthpiece (7). The feeding station (1) is further provided with at least a second reservoir (5) for a second animal food component, a second conveyor pipe (16) connected to the second reservoir with a second conveyor screw (19) extending internally of the second conveyor pipe (16). A first end of the second conveyor screw (19) is coupled adjacent to the second reservoir (5) to a second drive (23) which is rotatable independently of the first drive (21). The second conveyor pipe (16) is joined together with the first conveyor pipe (15) adjacent to a second end of the second conveyor screw (19). The first and second drives (21, 23) are operable by a control (Continued)

unit (33) in accordance with a desired mixing ratio of the first and second animal food components.

16 Claims, 3 Drawing Sheets

(52) U.S. Cl.
CPC .......... *A01K 5/0216* (2013.01); *A01K 5/0225* (2013.01); *A01K 5/0233* (2013.01); *A01K 5/0258* (2013.01); *A01K 5/0275* (2013.01)

(56) References Cited

U.S. PATENT DOCUMENTS

| | | | | |
|---|---|---|---|---|
| 3,707,246 A | * | 12/1972 | Ewell | A01K 5/0258 198/550.1 |
| 3,901,194 A | * | 8/1975 | Meyer | A01K 5/0275 119/53 |
| 4,154,376 A | * | 5/1979 | Jones | A01K 5/0208 119/57.7 |
| 4,735,171 A | * | 4/1988 | Essex | A01K 5/0291 119/51.12 |
| 4,890,577 A | * | 1/1990 | Maibach | A01K 5/02 119/52.1 |
| 2007/0113792 A1 | * | 5/2007 | Van Den Berg | A01K 5/0275 119/56.1 |
| 2012/0104032 A1 | * | 5/2012 | Bahn | B65B 1/12 222/1 |
| 2013/0186343 A1 | * | 7/2013 | Gordon | A01K 5/002 119/57.1 |
| 2016/0174520 A1 | * | 6/2016 | Liet | A01F 29/005 83/78 |
| 2017/0202178 A1 | * | 7/2017 | Gordon | A01K 5/0275 |

\* cited by examiner

FEEDING STATION FOR FARM ANIMALS, IN PARTICULAR FOR PIGS

CROSS-REFERENCE TO RELATED APPLICATION

This claims priority to Netherlands Application No. 2016638, filed Apr. 20, 2016, the entire contents of which is incorporated herein by reference in its entirety.

The invention relates to a feeding station for farm animals, in particular for pigs.

From the European patent specification with publication number EP0741965 a feeding device is known that is suitable in particular for pigs. This feeding device includes a dry food reservoir with a conveyor pipe provided with a conveyor means, such as a lead screw connected thereto. A free end of this conveyor pipe can be taken by a pig as a mouthpiece into its mouth. An operating element arranged adjacent to the free end of the conveyor pipe can be actuated through contact by the pig and thereby activate the conveyor means. Such a feeding device is attractive because, unlike with the use of troughs, waste of food can be prevented to a considerable extent. A drawback that is nonetheless experienced in practice is that the pigs that utilize this device can have individually different food requirements, whereas the known feeding device can dispense only a single kind of food composition from the reservoir. In particular when the known feeding devices have automatic control, using ear tag recognition, it is only possible to regulate the rationing individually per animal, but not the composition of the feed.

With fattening pigs it is possible, by means of transponders attached to the animals, such as ear tags, or implanted transponders, or by determination of the weight, to determine individual feed requirements. Per animal, it is for instance possible to make a distinction in the need for various feed components which can be composed by a selection of starter feed, growing feed or finishing feed. Also on the basis of individual animal weight, alone or in combination with individual animal recognition, particular feed requirements can be recognized. Starter feed, growing feed or finishing feed can also be composed by mixing two or more food components in a specific ratio predetermined per type of feed. Nonetheless, it is then always necessary to use different feeding devices and to allow the pigs individual access solely to the feeding device having the suitable feed in its reservoir. This method is laborious and moreover requires considerable additional investments on additional feeding devices, on infrastructure, such as partitions and automatically operable access gates within the animal living quarters. Moreover, research has shown that an overly confined feeding place has an adverse effect on the frequency at which the feeding place is visited by different animals and the feed per animal is less well distributed. This is due to inefficient occupancy of the feeding place by a single animal, while as a consequence other animals have less access to the feed they need. A frequent interruption at a less-confined feeding place promotes access of all animals to the feeding place. Indeed, it has also been attempted to solve this problem by interrupting dosage of a complete ration of feed at regular intervals and thereby stimulating an eating animal to make the feeding place available to other animals. With such portioning of the complete ration into so-called batches, better results have already been achieved, but as a result of the use of waiting periods between the batches the overall capacity of the system decreases. It has been found in practice that when other pigs can present themselves for a feeding session of their own initiative without there being any waiting times, a still more balanced feeding of the whole flock can be achieved. Moreover, a higher capacity can then be achieved with the system at the same time.

It is therefore an object of the present invention to eliminate these drawbacks and to improve the known feeding device such that it can serve as a feeding station for feeding animals with individually different feed requirements individually and with precision.

To this end, the invention provides a feeding station as defined in one or more of the claims appended to this description. The improved feeding station according to the invention at least comprises: a first reservoir for a first animal food component, a first conveyor pipe connected to the first reservoir, a first conveyor screw or auger extending internally of the first conveyor pipe, and a mouthpiece for reception in the mouth of an animal, wherein a first end of the first conveyor screw is coupled in the proximity of the first reservoir to a rotatable first drive and a second end of the first conveyor screw ends shortly before the mouthpiece, and further comprises at least a second reservoir for a second animal food component, a second conveyor pipe connected to the second reservoir with a second conveyor screw or auger extending internally of the second conveyor pipe, wherein a first end of the second conveyor screw is coupled adjacent to the second reservoir to a second drive which is rotatable independently of the first drive, wherein the second conveyor pipe is joined together with the first conveyor pipe in the proximity of a second end of the second conveyor screw, and wherein the first and second drives are operable by a control unit in accordance with a desired mixing ratio of the first and second animal food components.

With such a feeding station for farm animals, such as pigs, the individual animals can not only be rationed individually, but they can also be offered an individually determined food composition. Since, as a consequence, fewer feeding stations per animal population can suffice, considerable savings on investments can be made. Moreover, the feeding stations that are present can be deployed more efficiently in that access does not need to be restricted by additional partitions and automatic access gates. Since, with fewer partitions, other pigs can more easily present themselves for a feeding session, a ration per animal may also be dosed continuously. An animal can then keep on eating continuously or may be interrupted by another animal. When the ration of an animal whose identity has been established has not yet been dosed out completely because the animal has been ousted or itself has interrupted the food intake, dosage can be resumed again at any time until the complete ration has been taken in. This can result in a more balanced feeding of the whole flock, which seems to be confirmed by investigation in practice.

In a feeding station that comprises a second reservoir for a second animal food component, and having a second conveyor device and its own drive which is independently operable by a control unit, it may also be advantageous if the animal food components stored in the first and second reservoirs are dry food components. These dry food components are then preferred to be granular food components which, unlike dry products such as hay or straw, lend themselves better for supply by a conveyor device with a conveyor screw. Furthermore, a device may then be provided to mix the dry food components with a liquid, in particular water, prior to dispensing via the mouthpiece. In an implementation variant, a liquid supply may then be connected to at least one of the first and second conveyor pipes upstream of the mouthpiece. In a further variant, the upstream connection of the liquid supply may then be arranged far enough upstream of the mouthpiece to allow a pasty or doughy mixed food to be delivered to the mouthpiece.

In an implementation variant, the desired mixing ratio can be determined by the control unit at least partly on the basis of animal recognition through a transponder attached to the animal, such as an RFID tag. In another implementation variant, the desired mixing ratio can be determined by the control unit at least partly on the basis of an animal weight which in each case, when an animal is present in the feeding station, is established for that animal. In particular, an implementation variant is eligible in which the control unit is a model-based controller, which determines the desired mixing ratio and amount with a prediction model. In this manner, the feed gain is maximized for each individual animal. In yet another implementation variant, the desired mixing ratio can be determined by the control unit on the basis of a combination of an animal recognition and a corresponding animal weight established anew in each case. The animal weight, where applicable, may be determined in each case upon arrival and exit of an animal at the feeding station and these animal weights may then be added to a file by the control unit.

The operation of the first and second drives may additionally, if so desired, always be kept in agreement with an eating rate applying for an eating animal by the control unit.

Other advantageous aspects of the invention will be further elucidated on the basis of the following detailed description with reference to the appended drawings, in which.

Figure 1:
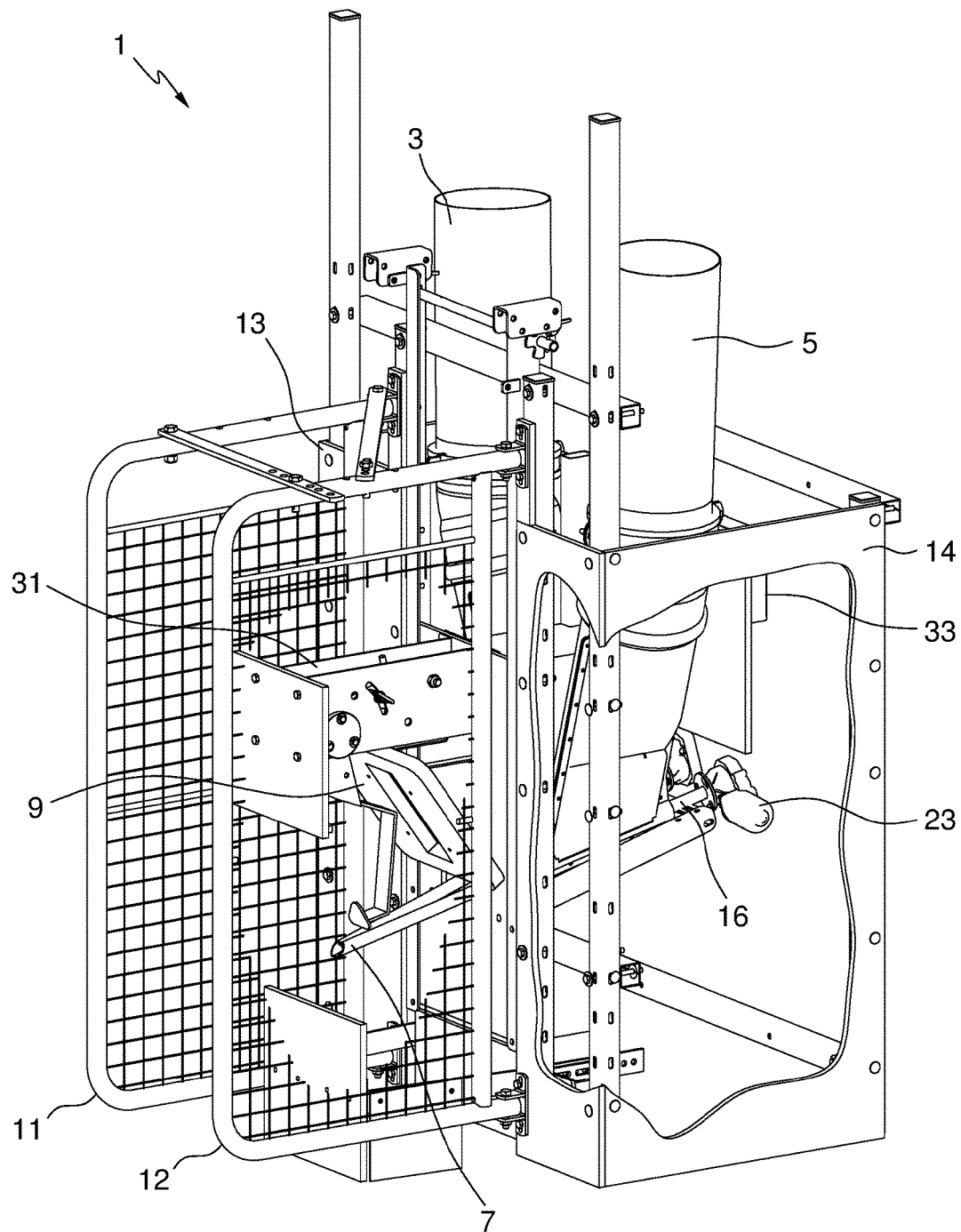
FIG. 1 shows in perspective a feeding station according to the invention.

A feeding station 1 according to the invention is shown in FIG. 1. The feeding station 1 has a first reservoir 3 for a first animal food component and a second reservoir 5 for a second animal food component. By means of a transport device which will be further described hereinbelow, the first and second animal food components can be supplied according to needs to a mouthpiece 7 which is positioned for reception in the mouth of, for example, a pig. In the proximity of the mouthpiece 7 a transmitter and receiver 9 is positioned for reading out an RFID transponder, attached to a pig, in which readable information on the identity of the pig is stored. Other forms of recognition than the example of an RFID tag mentioned here are, in principle, also possible and are to be considered equivalent thereto.

As further shown in FIG. 1, on either side of the mouthpiece 7, crush barriers 11, 12 are positioned, which protect the eating pig's head during eating. In FIG. 1 crush barrier 12 is partly omitted to provide a better view of the parts of the feeding station. The rest of the eating pig remains largely unprotected, because practice has shown that other pigs can then also present themselves (physically) for a feeding session, which results in a more balanced feeding of the whole flock. Animal recognition is provided only within the crush barriers 11, 12, but other pigs can physically stimulate an eating pig to make room. Behind the mouthpiece 7, where also the first and second reservoirs 3, 5 are set up, the conveyor device may also be protected by additional screening elements 13, 14. In FIG. 1 screening element 14 is partly omitted to provide a better view of the feeding station. In this embodiment, the screening elements 13, 14 are plastic panels, but other, similar screening elements are also possible, such as crush barriers.

Figure 2:
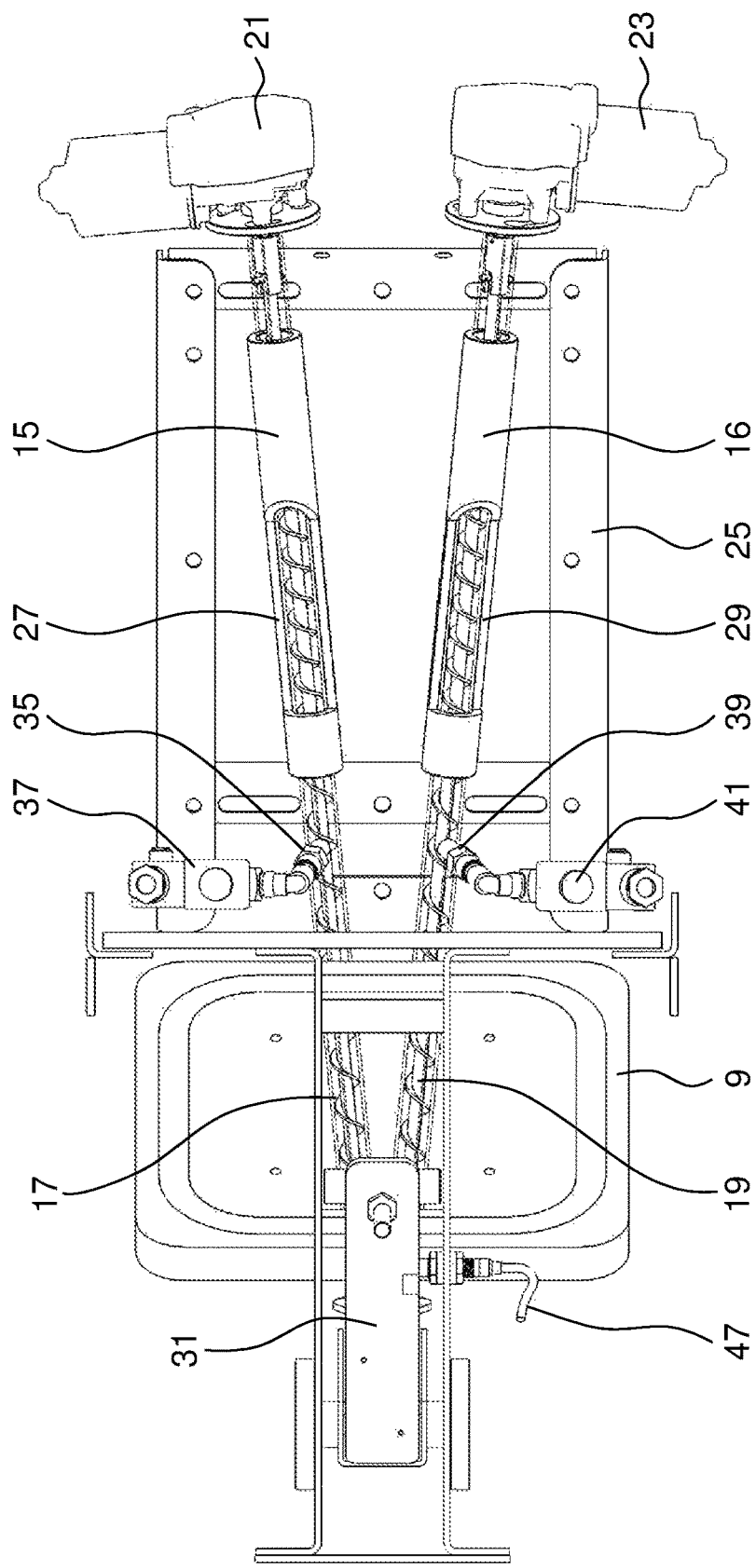
FIG. 2 is a top plan view, partly in cross section, of a conveyor device of the feeding station of FIG. 1.

In the partial top plan view of FIG. 2, the two reservoirs are omitted for clarity, so that first and second conveyor pipes 15, 16 connected to those reservoirs can be seen more clearly. These first and second conveyor pipes 15, 16 are part of the above-mentioned conveyor device for the animal food components. A first conveyor screw or auger 17 extends in the interior of the first conveyor pipe 15 and a second conveyor screw or auger 19 extends internally of the second conveyor pipe 16. A first end of the first conveyor screw 17 is coupled adjacent to the first reservoir (not shown in FIG. 2) with a first rotation drive 21. A first end of the second conveyor screw 19 is coupled adjacent to the second reservoir (not shown in FIG. 2) with a second rotation drive 23. These first and second rotation drives 21, 23 are implemented in this example as motor reductor units and are preferably mounted to a frame 25 via the corresponding first and second conveyor pipes 15, 16. To this frame 25, the first and second reservoirs 3, 5 may be mounted as well, the first reservoir 3 (not shown in FIG. 2) connecting to a first supply opening 27 in the first conveyor pipe 15, and the second reservoir 5 connecting to a second supply opening 29 in the second conveyor pipe 16.

Also seen in FIG. 2 is a switch unit 31, which is above the mouthpiece 7 (seen in FIG. 1), with which the individually converging first and second conveyor pipes 15, 16 link up. To this end, the converging first and second conveyor pipes 15, 16 are joined together in the direct proximity of the mouthpiece 7. The first and second conveyor screws 17, 19 terminate by their free ends shortly before the junction of the first and second conveyor pipes, at a point located under the switch unit 31. Due to this junction in the direct proximity of the mouthpiece (7 in FIG. 1), mixing of animal food components takes place not in the conveyor pipes, but exclusively in the mouthpiece.

The first and second rotation drives 21, 23 are separately controlled by a control unit 33, which is shown in FIG. 1, for a proper mixing ratio of the first and second animal food components. The control unit 33 in this example is implemented as a model-based controller, which determines the desired mixing ratio and amount on the basis of a prediction model. Doing so, the feed gain can then be maximized for each individual animal.

Further, it can be seen in FIG. 2 that the first conveyor pipe 15, upstream of the mouthpiece 7 (which is under the switch unit 31), has a first water connection 35. The first water connection 35 is equipped with an electromagnetically operated valve 37, which may also be controlled by the control unit 33. Likewise, the second conveyor pipe 16, in this example, comprises a second water connection 39 with a corresponding electromagnetic valve 41, which may also be controlled by the control unit 33 shown in FIG. 1. It is desired that the first and second water connection 35, 39 be each connected to the conveyor pipes 15, 16 at least so far upstream of the mouthpiece 7 that an animal food component presented as a dry feed component can be delivered to the mouthpiece as a pasty or doughy mixture.

Figure 3:
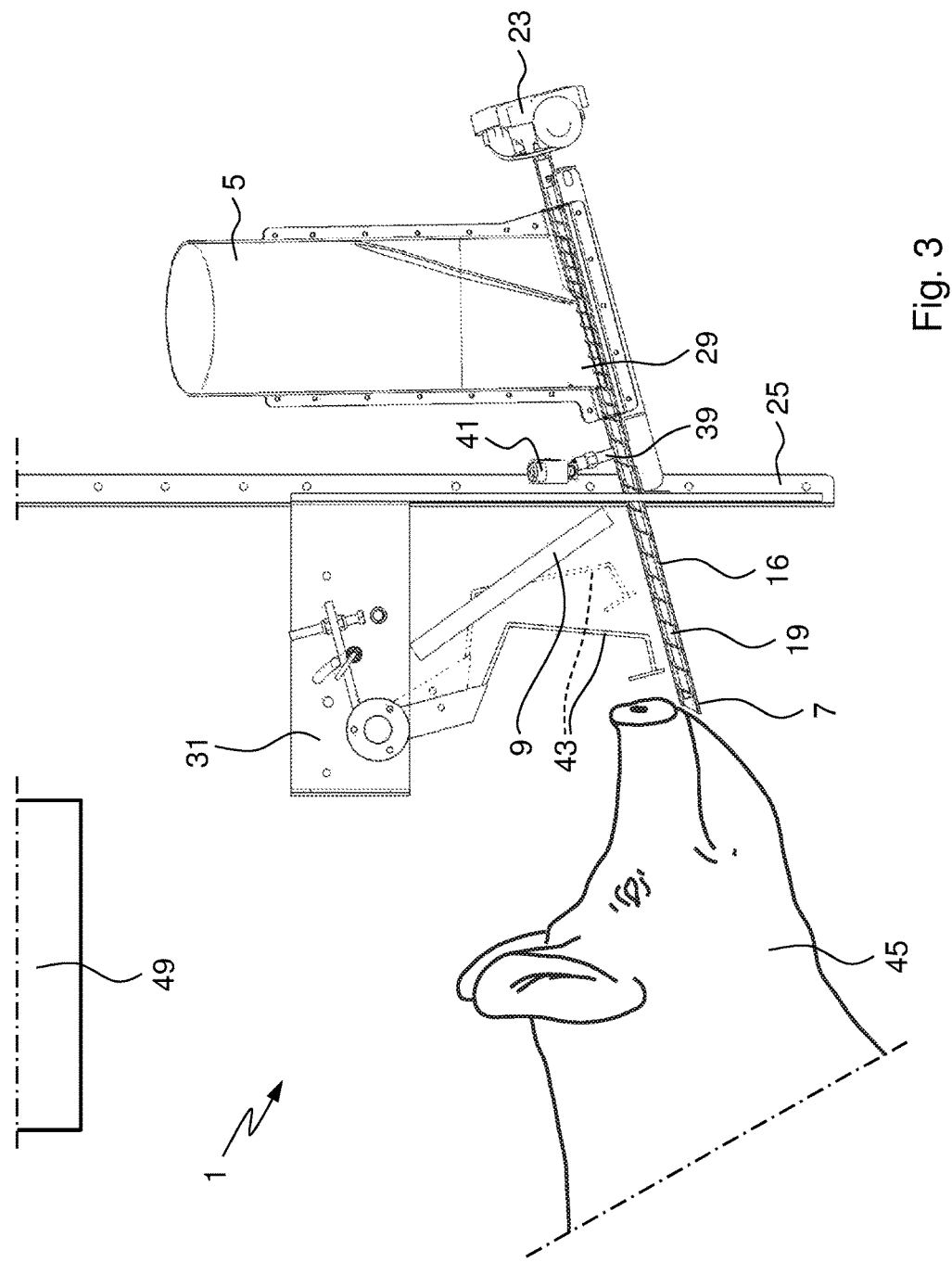
FIG. 3 is a detailed side view, also partly in cross section, of the conveyor device of FIG. 2, with the mouthpiece visible at a free end thereof.

In the side view of FIG. 3, the operation of the food conveyor and mixing system of the feeding station is shown in more detail. The switch unit 31 arranged above the mouthpiece 7 comprises a pivotally suspended operating arm 43. The operating arm 43 is operated by the snout of a pig 45 when it takes the mouthpiece 7 into its mouth. As a result, the operating arm 43 takes up the position drawn in dotted lines in FIG. 3 and in the switch unit 31 a contact is operated that is connected with the control unit (33 in FIG. 1). The switch unit 31 is also configured to receive signals from the RFID transmitter and receiver 9 and, also for that purpose, is connected with the control unit 33 (in FIG. 1) via a cable connection 47 (see FIG. 2).

The feeding station 1, as can be seen in the partial view of FIG. 3, may be further equipped with a camera 49 to determine animal weight. Possibly, the camera 49 can also be used to record animal movements. This camera 49, also, may be connected with the control unit 33 (designated in FIG. 1).

Having regard to the foregoing, it will be clear to those skilled in the art that after recognition of an animal by reading out an RFID transponder attached to it, the feed can be automatically composed from the first and second food components in the desired ratio by driving the first and second rotation drives 21, 23, by switching on and off, each by an own number of revolutions. Optionally, also the driving speed of the first and second rotation drives 21, 23 may be varied by adjusting the speed. Thus, in addition, provision can be made for the resulting supply speed of the components combined in the mouthpiece 7 to be in agreement with the eating rate of an eating pig still better, and under all circumstances. After the animal stops eating, or as soon as the respective ration has been reached, both rotation drives 21, 23 are immediately stopped and no loss or waste of foodstuffs will occur. When after the interruption of the feed of an animal, an animal of a different identity presents itself, the latter will not be fed any remnants of the preceding animal, but will receive exactly and precisely the food composition it needs. A particular advantage here is that no residual feed is left behind that can be stolen by another animal, which makes dosing per animal extremely accurate.

It is further possible to provide the feeding station with a weighing device, in addition to or instead of the camera 49, with which the weight of the animal that presents itself for feeding can be established. Such a weighing device is not shown in the figures, but in itself is entirely conventional and known to those skilled in the art. When such weighing device is also connected with the control unit 33 (of FIG. 1), then, just as when the camera 49 is used for this, by determining the weight prior to a feeding session and following a feeding session, an extra check can be obtained about the ingested feed and the effect of preceding feeds. These weight data can be stored by the control unit, per animal, in a file. In a simplified implementation of the feeding station according to the invention, it is also conceivable that the food composition is adjusted exclusively on the basis of animal weight.

Thus, with reference to the drawing figures, a feeding station for farm animals 45, such as, in particular, pigs, has been described which comprises a first reservoir 3 for a first animal food component, a first conveyor pipe 15 connected to the first reservoir 3, with a first conveyor screw 17 extending internally of the first conveyor pipe 15, and a mouthpiece 7 for reception in the mouth of an animal 45. A first end of the first conveyor screw 17 is coupled in the proximity of the first reservoir 3 to a rotatable first drive 21 and a second end of the first conveyor screw 17 ends shortly before the mouthpiece 7. The feeding station 1 further comprises at least a second reservoir 5 for a second animal food component, a second conveyor pipe 16 connected to the second reservoir 5 with a second conveyor screw 19 extending internally of the second conveyor pipe 16. A first end of the second conveyor screw 19 is coupled adjacent to the second reservoir 5 to a second drive 23 which is rotatable independently of the first drive 21. The second conveyor pipe 16 is then joined together with the first conveyor pipe 15 adjacent to a second end of the second conveyor screw 19, in direct proximity of the mouthpiece 7. The first and second drives 21, 23 are operable by a control unit 33 in accordance with a desired mixing ratio of the first and second animal food components.

It is believed that the construction and the operation of the invention are readily apparent from the foregoing description. The invention is not limited to any embodiment described herein. For the sake of clarity and conciseness of the description, herein features have been described as part of the same or of separate embodiments. It will be clear to those skilled in the art that the scope of protection of the invention also encompasses embodiments that comprise combinations of any or all of the features described. Within the purview of the skilled person, alterations are possible, such as kinematic inversions, which are understood to be within the scope of protection.

The invention claimed is:

1. A feeding station for farm animals comprising:
   a first reservoir for a first animal food component,
   a first conveyor pipe connected to the first reservoir,
   a first conveyor screw extending internally of the first conveyor pipe, and
   a mouthpiece for reception in the mouth of an animal,
   wherein a first end of the first conveyor screw is coupled adjacent to the first reservoir to a rotatable first drive and a second end of the first conveyor screw ends shortly before the mouthpiece,
   further comprising at least a second reservoir for a second animal food component,
   a second conveyor pipe connected to the second reservoir with a second conveyor screw extending internally of the second conveyor pipe,
   wherein a first end of the second conveyor screw is coupled adjacent to the second reservoir to a second drive which is rotatable independently of the first drive,
   wherein the second conveyor pipe is joined together with the first conveyor pipe adjacent to a second end of the second conveyor screw directly adjacent to the mouthpiece, and
   wherein the first and second drives are operable by a control unit in accordance with a desired mixing ratio of the first and second animal food components.

2. The feeding station according to claim 1, wherein the animal food components stored in the first and second reservoirs are dry granular food components.

3. The feeding station according to claim 2, further comprising a device for mixing the dry granular food components with a liquid prior to dispensing via the mouthpiece.

4. The feeding station according to claim 3, wherein a liquid supply is connected to at least one of the first and second conveyor pipes upstream of the mouthpiece.

5. The feeding station according to claim 4, wherein the upstream connection of the liquid supply is arranged far enough upstream of the mouthpiece to deliver a pasty or doughy mixed food to the mouthpiece.

6. The feeding station according to claim 1, wherein the control unit is a model-based controller, which determines the desired mixing ratio and amount on basis of a prediction model.

7. The feeding station according to claim 1, wherein the desired mixing ratio is determined by the control unit at least partly on basis of animal recognition by means of a transponder attached to the animal.

8. The feeding station according to claim 1, wherein the desired mixing ratio is determined by the control unit at least partly on basis of an animal weight which in each case, when an animal is present in the feeding station, is established for that animal.

9. The feeding station according to claim 1, wherein the desired mixing ratio is determined by the control unit on basis of a combination of an animal recognition and a corresponding animal weight established anew in each case.

10. The feeding station according to claim 8, wherein the animal weight is determined by a camera.

11. The feeding station according to claim 8, wherein the animal weight in each case is determined upon arrival and upon exit of an animal from the feeding station and wherein these animal weight data are added to a file by the control unit.

12. The feeding station according to claim 1, wherein the operation of the first and second drives is in accordance with an eating rate applying for an eating animal by the control unit.

13. The feeding station according to claim 1, wherein the control unit is configured such that uninterrupted dosage of an individual ration can take place, but that upon interruption of the ration intake, a remainder of the ration remains available for later intake.

14. The feeding station according to claim 9, wherein the animal weight is determined by a camera.

15. The feeding station according to claim 9, wherein the animal weight in each case is determined upon arrival and upon exit of an animal from the feeding station and wherein these animal weight data are added to a file by the control unit.

16. The feeding station according to claim 10, wherein the animal weight in each case is determined upon arrival and upon exit of an animal from the feeding station and wherein these animal weight data are added to a file by the control unit.

* * * * *